Patented Aug. 27, 1929.

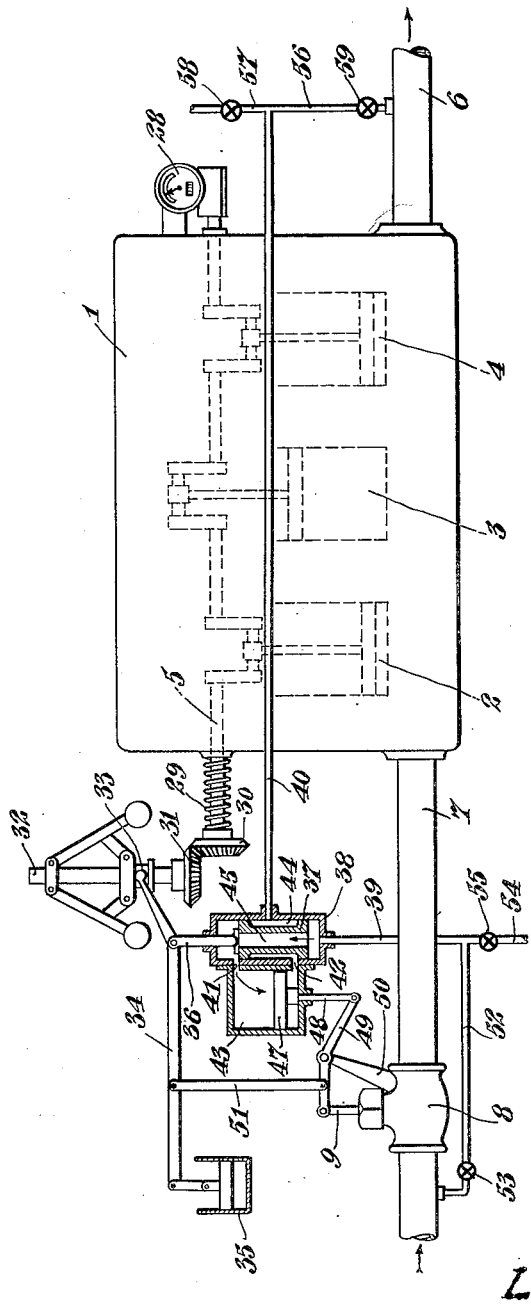

1,725,783

UNITED STATES PATENT OFFICE.

LUIS DE FLÓREZ, OF POMFRET, CONNECTICUT.

APPARATUS FOR FLOW CONTROL.

Original application filed September 17, 1925, Serial No. 56,938. Divided and this application filed December 7, 1926. Serial No. 153,133.

My invention relates to flow control apparatus and more particularly to one where the control is responsive to the movement of a measuring device as determined by the flow of a fluid which is being measured by that device. By relating the control means to the movement of a measuring device actuated by the fluid to be regulated, any changes in the flow resulting from variations in the speed, rate of flow or viscosity of the fluid will effect corresponding changes in the movement of the measuring device to stabilize the flow through the aforesaid control means. In the industrial uses of fluids such as oil distillation, it is not only desirable to measure the quantity but also to establish a predetermined flow and maintain it at that point. The application of my invention aims to fulfill both of these conditions automatically, thus to eliminate any manual control after the initial adjustment.

This application is a division of my application Serial No. 56,938, filed September 17, 1925. In the embodiment of my invention herein described and claimed, I utilize a displacement piston meter having registering means such as a revolution counter, and the speed of the meter or registering device resulting from the fluid flow actuates a governor controlling an hydraulic valve, which in turns controls the position of a valve governing the fluid flow through the meter. Since changes in the speed, pressure or viscosity of the fluid will vary the movement of the meter accordingly, such variations will be transmitted to the control means to maintain a constant flow.

Other and further advantages of my invention will be apparent from the following specification and drawings. The single figure of the drawings shows a side elevation partially in section, of a displacement meter arranged with a governor controlled hydraulic valve, in accordance with my invention.

In the drawing, 1 indicates generally a displacement or piston meter in which are measuring cylinders 2, 3 and 4, the pistons of which drive the shaft 5 as is well known in this type of meter. The fluid discharge pipe from the meter is shown at 6, while the corresponding inlet pipe is at 7 in which is a control valve 8 having a spindle 9. The shaft 5 extends beyond the meter 1 and has at one end a revolution counter 28 directly connected to the shaft, and on the other end of the shaft 5 is loosely placed a coil spring 29, one end of which is fixed to the shaft 5 and the other end to the bevel gear 30. This bevel gear is mounted upon but not fixed to the shaft 5; the spring 29 forming the driving connection between shaft 5 and the gear 30. In mesh with the gear 30 is another bevel gear 31 which is attached to and drives the shaft 32 of a governor; in this instance, one of the fly-ball type. The sleeve 33 of this governor forms a bearing for one end of the lever 34, the other end of which is pivotally connected to the dashpot 35. The lever 34 has a pivoted connecting link 36 which connects with the piston 37 of the hydraulic valve 38, this valve having an inlet pipe 39 and an exhaust pipe 40, ports 41 and 42 opening into the cylinder 43 and passages 44 and 45 through which the liquid passes according to the position of the piston 37. The cylinder 43 has a piston 47 and a piston rod 48 connected to the lever 49 which is pivoted to the bracket 50 and to the valve stem 9 while the link 51 pivotally connects both of the levers 49 and 34. The above mentioned inlet pipe 39 has a branch 52 leading to the main pipe 7 and which is controlled by the valve 53 and also an extension 54 controlled by the valve 55, it being the purpose of this extension to utilize a source of liquid exterior to the pipe 7 if so desired. The exhaust pipe 40 terminates in two branches, one 56 going to the pipe 6 and controlled by the valve 59, and the other branch 57 going to any suitable place of exhaust and controlled by the valve 58. Then assuming that the governor has been set for the correct flow, the vertical position of the sleeve 33 would be such that the ports 41 and 42 would be closed by the piston 37, the piston 47 would be held stationary because of the fluid above and below it and no change will occur in the valve 8. However, if any change occurs in the viscosity, speed or pressure of the liquid flowing in pipe 7, the speed of the meter 1 will change accordingly. If the meter speed should fall due to a change in flow conditions in pipe 7, the governor would slow down and the sleeve 33 would drop accordingly and because of the consequent depression of the lever 34, the piston 37 would assume a position somewhat as shown in the drawing. Therefore, liquid from the inlet pipe 39 would flow through the central passage 45 and the port 41 to the cylinder 43 above the piston 47 to force it downward while the exhaust fluid from below this piston would flow through the port 42, the annular passage 44 and out through the exhaust pipe 40. As the piston 47 moves down, the lever 49 is rocked and the opening of the valve 8 increased by the raising of the stem 9 to increase the flow in pipe 7. As the lever 49 is rocked and the stem 9 is raised, the link 51 moves upward to raise the lever 34 against the resistance of the dashpot 35; it being evident that the other end of the lever 34 cannot move as it is held in its position by the governor. Therefore the link 51 will force the lever 34 to pivot about its end which is held in the sleeve 33 and in so doing, the link 36 will move upward with the lever 34 and the piston 37 be carried with it to a position where the ports 41 and 42 are closed. Consequently no further movement of the piston 47 would take place and the valve 8 would remain in its new position. A similar result follows when the conditions of flow in pipe 7 change so that the speed of the meter is increased. Then the piston 37 would rise as the speed of the governor rose, liquid would flow below the piston 47 to raise the valve 8 and close the valve 8, followed by the closing of the ports 41 and 42 as lever 34 is pulled down by the link 51 and the retention of valve 8 in its more closed position. It will thus be seen that the action of the governor, the hydraulic valve and the link motion is one where corrections are applied to the vlave 8 in stated amount and that there is no hunting of the valve. A correction is applied which is proportioned to the movement of the governor and when once applied, is not carried beyond either above or below the required amount but is stopped at the proper point. The function of the spring 29 is that of a resilient driving connection between the shaft 5 and the gear 30 so that any sudden change in the speed of the meter will be taken up gradually by the spring and no sudden strain is put upon the governor or its mechanism.

It will be evident from the disclosure of the principle of my invention that many changes and variations can be made without departing from the spirit thereof, and I include within the scope of my claims all such changes and variations.

I claim:

1. Apparatus for regulating the flow of liquids, comprising in combination, a pipe through which there is a flow of liquid, a displacement meter in said pipe, a flow regulating valve in said pipe, a governor adapted to be driven by said meter, a pilot valve responsive to the position of said governor, hydraulic means controlled by said pilot valve for operating said regulating valve, and means actuated by the movement of said regulating valve for restoring said pilot valve to its closed position after each actuation of said regulating valve, whereby hunting of said regulating valve is prevented.

2. Apparatus for regulating the flow of liquids, comprising in combination, a pipe through which there is a flow of liquid, a displacement meter in said pipe, a flow regulating valve in said pipe, a governor adapted to be driven by said meter, a pilot valve responsive to the position of said governor, hydraulic means controlled by said pilot valve for operating said regulating valve, a connection between said pipe and said pilot valve for supplying operating fluid to said hydraulic means, and means actuated by the movement of said regulating valve for restoring said pilot valve to its closed position after each actuation of said regulating valve, whereby hunting of said regulating valve is prevented and the operation of the regulating valve is made responsive to changes in the condition of the liquid flowing through said pipe.

In testimony whereof, I have signed my name to this specification this 2nd day of December, 1926.

LUIS DE FLOREZ.